United States Patent
Halpin et al.

(10) Patent No.: US 7,475,807 B2
(45) Date of Patent: Jan. 13, 2009

(54) METHOD AND APPARATUS FOR PROCESSING CHECKS

(75) Inventors: James H. Halpin, New Milford, CT (US); Keith MacBeath, Fort Lee, NJ (US)

(73) Assignee: De La Rue International Limited, Hampshire (GB)

(*) Notice: Subject to any disclaimer, the term of this patent is extended or adjusted under 35 U.S.C. 154(b) by 653 days.

(21) Appl. No.: 10/969,991

(22) Filed: Oct. 22, 2004

(65) Prior Publication Data

US 2005/0108168 A1 May 19, 2005

Related U.S. Application Data

(60) Provisional application No. 60/513,606, filed on Oct. 24, 2003.

(51) Int. Cl.
*G06K 15/00* (2006.01)

(52) U.S. Cl. .................. 235/378; 235/379; 235/383; 235/385

(58) Field of Classification Search .......... 235/378, 235/379, 383, 385; 902/22; 705/16, 45
See application file for complete search history.

(56) References Cited

U.S. PATENT DOCUMENTS

| | | | |
|---|---|---|---|
| 4,399,508 A | 8/1983 | Nakatani et al. | |
| 4,523,330 A | 6/1985 | Cain | |
| 5,193,121 A | 3/1993 | Elischer et al. | |
| 5,801,366 A | 9/1998 | Funk et al. | |
| 5,874,717 A | 2/1999 | Kern et al. | |
| 5,897,625 A | 4/1999 | Gustin et al. | |
| 5,910,988 A | 6/1999 | Ballard | |
| 6,032,137 A | 2/2000 | Ballard | |
| 6,351,735 B1 | 2/2002 | Deaton et al. | |
| 6,363,164 B1 | 3/2002 | Jones et al. | |
| 6,507,670 B1 | 1/2003 | Moed | |
| 6,647,136 B2 | 11/2003 | Jones et al. | |
| 6,661,910 B2 | 12/2003 | Jones et al. | |
| 6,724,927 B2 | 4/2004 | Jones et al. | |
| 2002/0085745 A1 | 7/2002 | Jones et al. | |
| 2002/0103757 A1 | 8/2002 | Jones et al. | |
| 2002/0122580 A1 | 9/2002 | Jones et al. | |
| 2002/0126885 A1 | 9/2002 | Mennie et al. | |
| 2002/0145035 A1 | 10/2002 | Jones | |
| 2002/0150279 A1 | 10/2002 | Scott et al. | |
| 2002/0152164 A1 | 10/2002 | Dutta et al. | |
| 2002/0195485 A1 | 12/2002 | Pomerleau et al. | |
| 2003/0009420 A1 | 1/2003 | Jones | |
| 2003/0033252 A1 | 2/2003 | Buttridge et al. | |
| 2003/0059098 A1 | 3/2003 | Jones et al. | |
| 2003/0081824 A1 | 5/2003 | Mennie et al. | |
| 2003/0202690 A1 | 10/2003 | Jones et al. | |
| 2004/0222283 A1 | 11/2004 | Mastie et al. | |

FOREIGN PATENT DOCUMENTS

WO WO 97/38402 10/1997

*Primary Examiner*—Seung H Lee
(74) *Attorney, Agent, or Firm*—Oliff & Berridge, PLC

(57) ABSTRACT

A check processing system and method comprising utilizes an image scanner that produces an electronic image of a check upon scanning of the check. The system and method receive the electronic image of the check from the image scanner, receive point-of-sale data generated at a point-of-sale, determine a monetary value of the check from the electronic image of the check, and reconcile the determined monetary value of the check with the point-of-sale data so that the check is correlated with a transaction that occurred at the point-of-sale.

65 Claims, 5 Drawing Sheets

METHOD AND APPARATUS FOR PROCESSING CHECKS

RELATED PROVISIONAL APPLICATION

This nonprovisional application claims the benefit of Provisional Application No. 60/513,606, filed Oct. 24, 2003.

BACKGROUND OF THE INVENTION

1. Field of Invention

The invention relates to methods and apparatus for processing checks in a retail environment and in particular to the processing, including reconciliation, automatically, in electronic form at the point-of-sale (POS) or in the back office of a retailer and/or off-site.

2. Description of Related Art

Most retailers, including department stores, food stores, large retail chains, such WAL-MART and TARGET, warehouse retailers, wholesalers, etc., accept checks in exchange for goods and/or services. Other vendors, service providers, credit card companies, property management companies, etc. as well, accept checks as a form of payment. The volume of checks received can be considerable. Generally, upon receipt of the check its monetary value is initially recorded. In addition, the checks collected for subsequent further processing, including reconciliation, leading to their deposit at the recipient's bank.

For example, in the retail environment, the retailer will first accept a check in payment at the point-of-sale (POS) register where the value is entered during the transaction by the cashier. The checks are arranged in the till in the approximate order of their receipt. The physical checks are collected at each register or till and suitably associated with the respective till and subsequently processed typically at the retail site. This processing is done to provide a check listing (add list) and/or a bank deposit slip for depositing received checks with the retailer's bank. The check processing would normally require that there be a reconciliation of the accepted checks with point-of-sale data generated at, e.g., the register where the check was received at the retail establishment, if such data is available.

In the retail environment, reconciling checks includes confirming that the amount written on the check corresponds to the check amount that was entered into the register at the point-of-sale (hereafter such a register is referred to as a POS register). For example, a key usually is pressed on the POS register indicating that a particular transaction is being paid for by a check. A log is created and stored in memory indicating the checks received, their respective amount and the particular POS register where received.

Later, in the back office, a bank deposit slip and/or a check listing to accompany the slip is prepared listing all of the checks received and their value based on a visual read of the monetary value of each check. A total is arrived at and compared to the check read total listed on the log created as noted above. If the totals match, the checks are accepted for deposit. If the totals do not match, the log can be printed out and manually checked to determine where discrepancies may lie. Once the listing total is reconciled with the log, the accepted checks are then available for deposit.

It is not uncommon that the POS registers include a magnetic reader. These are used to read code lines which are provided at the bottom of a check. Typically the code lines are both humanly readable and machine readable by the magnetic reader and provide information which facilitates processing primarily by the banks. This information includes the bank on which the check is drawn, a routing/transit number, and the account number of the customer who wrote or made out the check. This data read from the check is generally referred to as MICR data, where MICR stands for Magnetic Ink Character Recognition. These POS registers also may print the amount of the check that was entered into the POS register on the check and include or associate the read MICR data with other data obtained by the POS register such as the transaction amount, a transaction identifier such as a transaction number, and a respective till and/or cashier identifier.

Heretofore, the use of the MICR data on the code line by a retailer has been limited. For example, it is known to provide a system in which a customer presents the cashier with a check from the customer's account so that the cashier can use data on the check in order to debit the customer's banking account. In such a system, the check is passed through a magnetic ink reader, which is used to read the MICR data from the check. This data together with the amount entered at the register is presented to the customer's bank through an appropriate communication link. The check is then returned to the customer at the POS and is considered to be canceled by the customer's financial institution. The transmitted data then is used to debit the customer's checking account for the amount of the particular transaction. This process is known as check conversion.

Various techniques employing MICR data are available for simplifying check processing. So-called drop encoders exist, which typically are used by large retail establishments, in order to process checks that have been received from customers. The device is used by an operator who reads the monetary value for each check, inputs that data to the encoder, which then prints data representative of that value onto the check on the MICR code line in magnetically-readable ink. This data including the added value, is read by financial institutions when processing the checks.

In order to be cost efficient, the operator must be able to process checks at an extremely high rate. Thus, substantial training is required to operate such encoding equipment. Some retailers use a third party, which for a fee employs specialized encoder operators, in order to accurately process checks from the retail establishment.

There also is known a check processing system that automatically "power" encodes checks using point-of-sale data. As noted above, the amount of a check is entered by a cashier at the time that the check is presented for payment. In this system, the check is passed through a MICR reader, and the cashier-inputted check amount is associated with the MICR data for that check. This data is transmitted to a database and stored. At a later time, the checks received over a predetermined transaction period are encoded by a "power" encoder that receives the data (check amount and MICR data) from the point-of-sale database. The power encoder reads the MICR data from a check that is being processed, matches it with the electronic transaction data received from the database, and then encodes the check by printing data representative of the check amount on the check, on the MICR code line, with magnetic ink.

It also is known in the banking industry to scan checks in order to obtain electronic images of the checks. The electronic images can be used within a particular bank to expedite internal processing of the checks. Further, within the industry, a number of interbank networks have been established in which participating members have agreed to debit or credit respective customer's accounts based on interpreted electronic images using agreed proofing procedures. Also, bank ATM machines will use Optical Character Recognition (OCR) software to confirm that the value entered on the check equals the amount entered on the machine, before the check is accepted.

Various techniques exist for performing character recognition on the images of checks. See, for example, US 2002/0150279A1 and US 2002/0152164A1. It also is known to provide a system for remote data acquisition and centralized processing and storage of check data. See U.S. Pat. No. 5,910,988.

U.S. Pat. No. 5,897,625 discloses an automated document cashing system that includes a reader for capturing an image of a negotiable instrument and recognizing the authorized signature as well as the amount written on the negotiable instrument. The system then transfers money in the amount of the instrument to a savings account, a checking account, a SMART card, or the like.

U.S. Pat. No. 4,523,330 discloses a method and apparatus for processing documents, the apparatus including a unit for reading machine-readable data and for generating image data from the documents as the documents are moved along a track. The unit includes recognition circuitry that receives the image data and a portion of the machine-readable data to produce recognition data along with confidence level data relative to the recognition data for each document. A control processor is used for storing the machine-readable data, image data, recognition data and confidence level data by an identification number which is assigned thereto by the control processor for each document. A second control processor examines the confidence level data for each document to select the machine-readable data, recognition data and image data for a document having a predetermined confidence level data, and transfers the selected data to a terminal for display on an associated monitor to enable an operator to effect data completion using a keyboard associated with the terminal. After data completion, an encode and sort unit is used to further process the documents.

It also is known to combine data from checks and from a point-of-sale in order to generate a transactional database about a retailer's customers. This can be used in developing customer profiles useful in targeting and implementing advertising, marketing and promotions. See, for example, U.S. Pat. No. 6,032,137 and U.S. Pat. No. 6,351,735.

SUMMARY OF THE INVENTION

Although there have been various methods and apparatus involving one or more of the various elements used in the present invention, none to date combine those elements in the unique way the methods and apparatus disclosed herein do to provide the performance necessary to satisfy the related requirements of the commercial customer, particularly the retailer.

It is therefore a first aspect of the present invention to minimize the human factor in the processing of checks in a retail or commercial, non-banking setting to thereby significantly reduce the opportunities for error with their attending delays and costs.

It is a further aspect of the invention to provide a method and implementing apparatus to automate the reconciliation step in the processing of checks and enable it to be done either at the retailer or off-site at a processing center.

It is still another aspect of the invention to implement the reconciliation step employing the POS data including the check amount and related information obtained from an image of the check.

One further aspect of the present invention is to enhance the reliability of the image recognition process performed on the check image through use of the transaction expected amount from the POS data against which is compared the value determinations made by the OCR software.

It is yet another aspect of the invention to provide a check listing as a consequence of the reconciliation involving the check images and POS data to be used together with a bank deposit slip for depositing the checks at the entity's bank.

It is still a further aspect of the invention to provide the data which will permit the generation of a bank deposit slip for checks directly.

Still further, it is an aspect of the present invention to provide an exception report for when the POS data including check amount and/or the check image data cannot confirm the existence of the other for a particular POS transaction or check image.

Another aspect of the invention is to extract predetermined information from the POS data and related check image data which will assist the entity in preparing a customer transactional database to facilitate subsequent advertising, marketing and promotional activities.

Another aspect of the invention is to provide check image data for all reconciled checks which will facilitate other check processing and collection operations, credit functions and check reconstruction operations, both on and off site.

Another aspect of the invention is to expedite the reconcilement of the POS data and to automate the preparation of bank check listings, reducing manual activity to exceptions only.

Another aspect of the present invention is to improve the process integrity in the handling of checks, so as to reduce losses and drive reductions in treasury costs, both in terms of bank fees and in terms of labor associated with deposit reconciliation.

Another aspect of the present invention is to enable a retailer to make centralized bank depositing so that funds availability from check deposits can be accelerated, and associated fees with check deposit accounts and their maintenance, and reconciliation, reduced.

Yet another aspect of the present invention is to position a retailer so that it may take advantage of future legislation directed to check-image processing laws.

BRIEF DESCRIPTION OF THE DRAWINGS

The invention will be described in detail with reference to the following drawings in which like reference numerals are used to identify like elements and wherein.

DETAILED DESCRIPTION OF PREFERRED EMBODIMENTS

Figure 1:
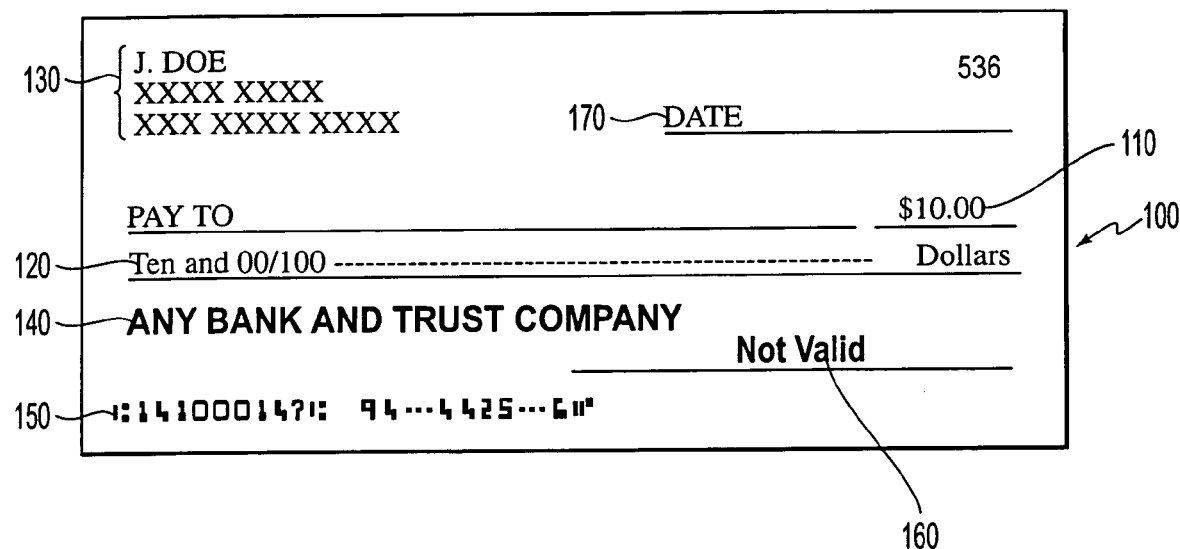
FIG. 1 illustrates an exemplative check.

While the following description focuses on an exemplary embodiment of a check processing system that implements aspects of the present invention as it is applied to handling checks received by a retailer at a point of sale, it is to be appreciated that the invention has broad application to the various scenarios where a vendor, service provider, credit card company, or other non-banking entity, regularly receives a high volume of checks and where the automatic processing of checks through deposit is cost efficient.

There is a considerable need to expedite check processing at the site of the retailer who regularly handles a large volume of checks. There is a further need to ensure that all data is captured early in the process and correctly such that the retailer is in a position to resolve any queries that may arise soon after the receipt of the check or at a later date (for example, if a check is lost or if a check is returned for non sufficient funds (NSF)). In order to expedite check processing and to ensure full capture of necessary data, it is one aspect of the invention to image a check at the retailer. The image of the check is then processed within the retailer or off-site, rather than using the physical check itself. Pertinent data on the check is extracted from the check image and used to validate the check, so as, for example, to create a check listing (add list) to accompany the bank deposit slip that is presented with the physical checks to the bank, and to reconcile or balance the register or till. During this process, it is sought to validate the value set out on a check against the expected value for the check, that is, the value included as part of the transactional data (POS data) entered at the point-of-sale. This allows for rapid identification of discrepancies (exceptions) which are reported to the retailer to facilitate their subsequent validation, if possible, through manual intervention. This aspect of the invention eliminates the manual creation of an add list and the need to encode the check, with their attending human involvement, delays, mistakes and expense.

This aspect of the invention does not necessarily change the way in which a bank processes checks. According to one embodiment, the bank receives the original checks (along with, for example, a bank deposit slip including the add list generated by an embodiment of the invention), and handles the physical checks as normal. The electronic images may be used to expedite the processing of deposits and/or the collection processes, and/or reduce the costs of such processes. For example, the electronic images of the checks may be submitted to and/or used by the bank or other third party, for example, a check collection agency, to pursue collection. The images may be used as an image replacement document (IRD) when a check has been mutilated or lost. Of course, if preferred, the electronic images of all deposited checks may be submitted to the bank with the bank deposit slip and with (or without) the physical checks.

Numerous advantages are obtained from aspects of the invention. By processing the image of the check by (or for) the retailer, it is possible to automatically derive data from the check image in order to automatically create the check or add listing. This is submitted with a bank deposit slip which accompanies the checks and possibly other payment media at the time of deposit with a bank. It also is unnecessary for the retailer to use internal resources in the check reconciliation process, because point-of-sale data and check image data can be used to automatically perform check reconciliation. In addition, discrepancies can be identified earlier in the payment cycle. Also, the capture of check images and related data assists in expediting and better resolving bank reconciliation issues such as checks in the deposit not listed on the add list, checks missing, and checks of discrepant value. As noted above, the image of the check can be used to derive the necessary customer and check value information if a check is returned for NSF or if mutilated or lost. This information then can be forwarded to the appropriate in-house department or third party for further proceedings.

Image capture also has benefits with respect to the cost of processing checks due to economies of scale. Checks are currently deposited at a local bank facility. Economies of scale can be achieved for the retailer if all checks are sent directly to a central point (a check processing center). With the invention, there is no need to involve the local bank facility. With the images captured, the central check processing center can handle checks for multiple stores within the same retail chain. This is currently risky because if a check is lost, the retailer which sent the checks to the check processing center is expected to bear the cost of the lost check. However, because banks will allow checks to be replaced if an image of the check is available, the risk of incurring costs due to checks being lost during transportation directly to the check processing center is minimized by this aspect of the invention. Thus, considerable savings can be made by eliminating the institutions and steps normally required between receipt of a check by a retailer and the clearing of the check at the central check processing center.

The electronic image of the check also may be used in order to expedite the process of recovering funds when a check becomes a return item. It has been found that the chance of receiving payment on a check returned for NSF decreases significantly with time, particularly after about two weeks from when the check was originally presented. Through the use of imaging, the retailer can review return-item images and capture from the image the data it needs to reach faster decisions about the return items, for example, if and when to re-present and/or to pursue collection through more aggressive recovery efforts.

Turning now to a preferred embodiment, FIG. 1 shows an exemplative check 100. The check includes a numerical or courtesy amount 110, and a legal or written amount 120, which should correspond to the courtesy amount, both of which are usually hand written onto the check by the customer. In addition, the check includes account holder information 130, which usually sets out at least the name of the person or persons or entity having the checking account. Information 130 also can include, for example, the address and/or the telephone number of the account holder. The typical check also includes the name 140 of the financial institution where the checking account is located. Checks also include a code line comprising MICR data 150, which identifies the financial institution and account number for the checking account, as well as additional information on occasion, including the check number (not shown). A signatory line 160 also is provided for the signature of the person authorized to draw. A date line 170 also is provided. Although these code lines are usually comprised of well known MICR data, they may alternatively be OCR data. The principles of the present invention are readily adaptable to that situation as well.

Various aspects of an embodiment of the invention now will be explained with reference to the accompanying figures as identified.

Figure 2:
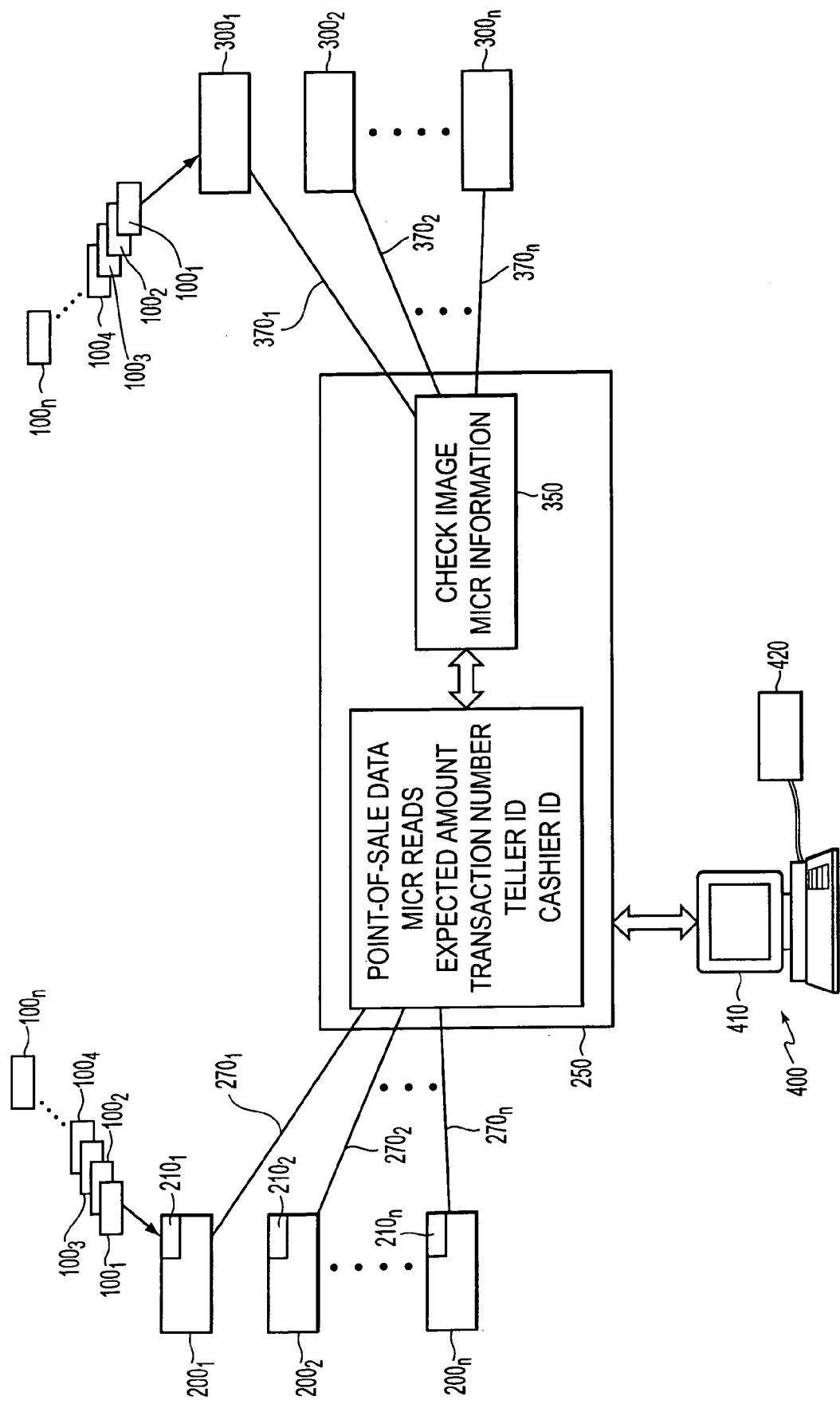
FIG. 2 generally illustrates a portion of an exemplary check processing system and method according to one embodiment of the invention.

As shown in FIG. 2, a retailer typically has positioned throughout its store(s) a plurality of point-of-sale (POS) registers where checks, $100_1, 100_2, 100_3, \ldots$ and $100_n$, and other payment media may be tendered in order to pay for items and/or services purchased from the retailer. Each POS register, for example $200_1, 200_2 \ldots 200_n$, where n is the number of such registers typically generates data for each sale. This data can be stored within the register, or can be transmitted to a data store in a host or central computer 250 over a communications network $270_1, 270_2 \ldots 270_n$, coupled with each one of the $200_n$ POS registers. The communications network $270_{1,2...n}$ may include a connection over one or more of a wide area network, a LAN, a storage area network, intranet or extranet connection, Internet, or any other distributed processing network or system. This data, hereafter referred to as POS data, typically includes a total amount of the transaction, a list of items purchased in the transaction, a transaction identifier such as, for example, a transaction number, the monetary value of the check as observed and entered into the register by the operator (the "expected" value) and, preferably a till and/or cashier identification number.

Since a significant percentage of all sales are paid for using checks, most POS registers are specially equipped to handle checks. Such POS registers typically include a key that is pressed by the operator of the POS register to indicate that a particular transaction is being paid for with a check. The POS register also typically includes a magnetic reader $210$ ($210_1$-$210_n$) that is used to read the MICR data from a check. This data is read in order to communicate with suitable databases, where a customer's check cashing history and other relevant data are stored (whether in-house or third party) to provide authorization for accepting the check. For the purposes of this aspect of the invention, this MICR data is included in the POS data generated by each POS register which is stored at 250.

Other points of entry at a retailer where checks can be received include, but are not limited to, check cashing or bill paying stations which would be similarly connected to the data store of the computer 250. These points also generate respective check identity and expected monetary value information which is stored at the data store in host computer 250. Collectively, hereinafter, for convenience all such points of entry shall be referred to as point of sale or POS registers.

For the further processing according to this aspect of the invention, the data store at computer 250 preferably includes for each check item, the MICR read (data), the expected value, the transaction number, and the till and/or cashier number. In the exemplary embodiment, the data is grouped in the data store by till and/or cashier. Still further, a particular register will prepare and store for a particular time-interval or batch, a total value of the expected amounts of the checks involved in the time interval or batch. This total value if determined will be useful at a subsequent stage in practicing aspects of the invention as seen hereinafter.

A check scanner 300 (image scanner) is shown functionally in FIG. 2. It includes an imaging camera and accompanying imaging software. One such check scanning device is the Source NDP check imager available from UNISYS Corporation. The capture of the check image may occur at the point-of-sale or at a location remote from the point-of-sale, for example, in the back office of the retailer. When the check scanning occurs at the point-of-sale, the electronic image of the check may be immediately associated with the other POS data corresponding to the transaction, which is obtained at the same time, and stored together in host computer 250.

The data yielded by the check scanner includes, for example, an electronic image of the check and MICR data (150 in FIG. 1) from the check if the check scanner 300 includes a magnetic reader as is the case with the Source NDP imager. OCR (Optical Character Recognition) data can be obtained from the electronic image of the check at any point after the image is captured.

Once the electronic image of a check has been captured, it is stored (either permanently or temporarily) onto a suitable hard disk, tape or other suitable data storage format. The image may be stored locally on the image capture device or communicated to a central data store 350, which may or may not be located in host computer 250, over a network $370_1$, $370_2 \ldots 370_n \ldots$ Where a network is not present, the images may be stored on a portable data storage format such as flash cards, memory sticks or the like.

In the situation where the further check processing is performed in the back office or off-site, the activity at the individual registers and/or other check receiving stations remains the same. Check and transaction identity information including the check expected amount and MICR data are obtained at the registers and forwarded to the data store in computer 250. In this variation, however, no check image is made at the register. The checks are collected at the register and ordered according to their receipt at the register. They are arranged with the same orientation. They are routinely collected by store personnel and brought to a secure area for further processing. They are segregated by register by suitable means, which includes transaction identification data signifying the beginning and end of the transaction activity period reflected by the accompanying check grouping.

In the back room, the groups of checks are reviewed to assure they are orientated the same, and then stored until ready for further processing. When the process is to continue, the batch is submitted to a document processing machine which includes an imaging capability. Again, the UNISYS Source NDP unit is a suitable processing machine for this function.

At this point in the process there are two sets of data stored for further processing. One set comprises the POS data including for each check the MICR read, the expected check amount and a transaction number. The other set available includes the check images and the MICR reads obtained during scanning. Both sets of data are at this point, un-validated, i.e., both are potentially suspect as to accuracy of indicated value and to completeness. The process requires that both sets of data be validated so that at the end of the validation process, the reconciliation or balancing of the individual tills as to the check media can be achieved. Then, the validated checks are accepted for deposit. The POS data and scanner data have been grouped and batched by time interval and/or transaction period with each group, further identified to till and/or cashier to establish a frame of reference for subsequent reconciliation. The complementing files of data, for a given interval are now processed. In addition to the specific data identified for each check being now available, the total number of checks processed through the register(s) and scanner(s) have been recorded and these numbers are available.

Computer 250 as noted above is a suitable host for storing the POS and scanner data. The computer may be accessed by an operator work station 400 which includes a display monitor 410. This display may be provided with a touch screen. The display coupled with one or more of a keyboard and mouse complete the user interface by which an operator may communicate with the check processing system. A printer 420 provides a means to generate printed documents reflecting work product of the process including the check listings or deposit slips, as preferred, exception reports, management reports, transaction and customer profile data, etc. Of course, the data would not only be available at the site, but also through appropriate data links available wherever management thought it might be needed.

In addition to the data storage capability, the programmed computer 250 will perform other functions during the course of check processing according to aspects of the invention. These may include some or all of the following: routing of data; analysis; processing; reconciliation; data transformation; work flow management and report generation. One example of a suitable software application which provides some of these elements of the processing activity is the CP4000™ payment media management system supplied by De La Rue Retail Payment Solutions located in New Jersey. The CP4000™ application might be installed in the host computer 250 or other suitable computer, not shown. It would be directly involved in work flow management; routing of data; reconciliation; processing and report generation.

Prior to validation, certain pre-validation activities take place. A typical daily procedure might transpire as follows. An operator would access the system through the work station interface 400. The operator/user would identify the till and/or the till cashier through appropriate keyboard or touch screen entry of the respective ids, as well as the transaction period for which the process is to be run. It is assumed that POS data has been recorded throughout a transaction period which would include a cashier's shift or a full day's shift for a register till, or some other interval, and is available. It is assumed further that the checks were not imaged at the till and are in the possession of the user. There are advantages in imaging the checks remote from the point of sale, for example in the back office. The advantage of imaging at the back office location is that from a physical work flow perspective it is closer to the bank deposit, reducing the risk of checks being mislaid before deposit and simplifying the batching of checks in predetermined quantities that may be required by the bank. The POS data for the till should include the number of checks taken in, the MICR data for each check received, and the relevant transaction data including the expected check value entered at the register. The work management software, for example the CP4000™ package would direct a search of the POS data store of computer 250 for the associated transaction period for the identified till. The system automatically loads the till number and quantity of checks to be imaged based on the retrieved POS data and prompts the user to run the checks through the check imaging device or scanner 300. (If the POS data file for the transaction period does not exist at the time of the check processing, the system would prompt the user to key in the till number and quantity of checks to be imaged and then proceed to run the checks through the scanner.) The user then loads the checks for the identified till in the scanner which transports and then images the checks. All correctly imaged checks are stored in a first pocket of the Source NDP device. The rejected checks are placed in a second pocket. The user then reruns the checks from the second pocket until all checks are imaged and deposited in the first pocket or the imaged check count falls within a predetermined range of the POS check count, for example 10%. The process can now proceed to the validation stage. The physical checks are placed in a secure storage container such as the Counter Cache® device available from De La Rue Retail Payment Solutions until the check processing is complete and they are to be deposited.

Once the pre-validation step is complete, the validation procedure can begin, although not necessarily, immediately. The economies of scale, with the consolidation of one store's further check processing activities (the further steps of validation) with those of others in the retail chain may dictate off-site processing.

Figure 3A:
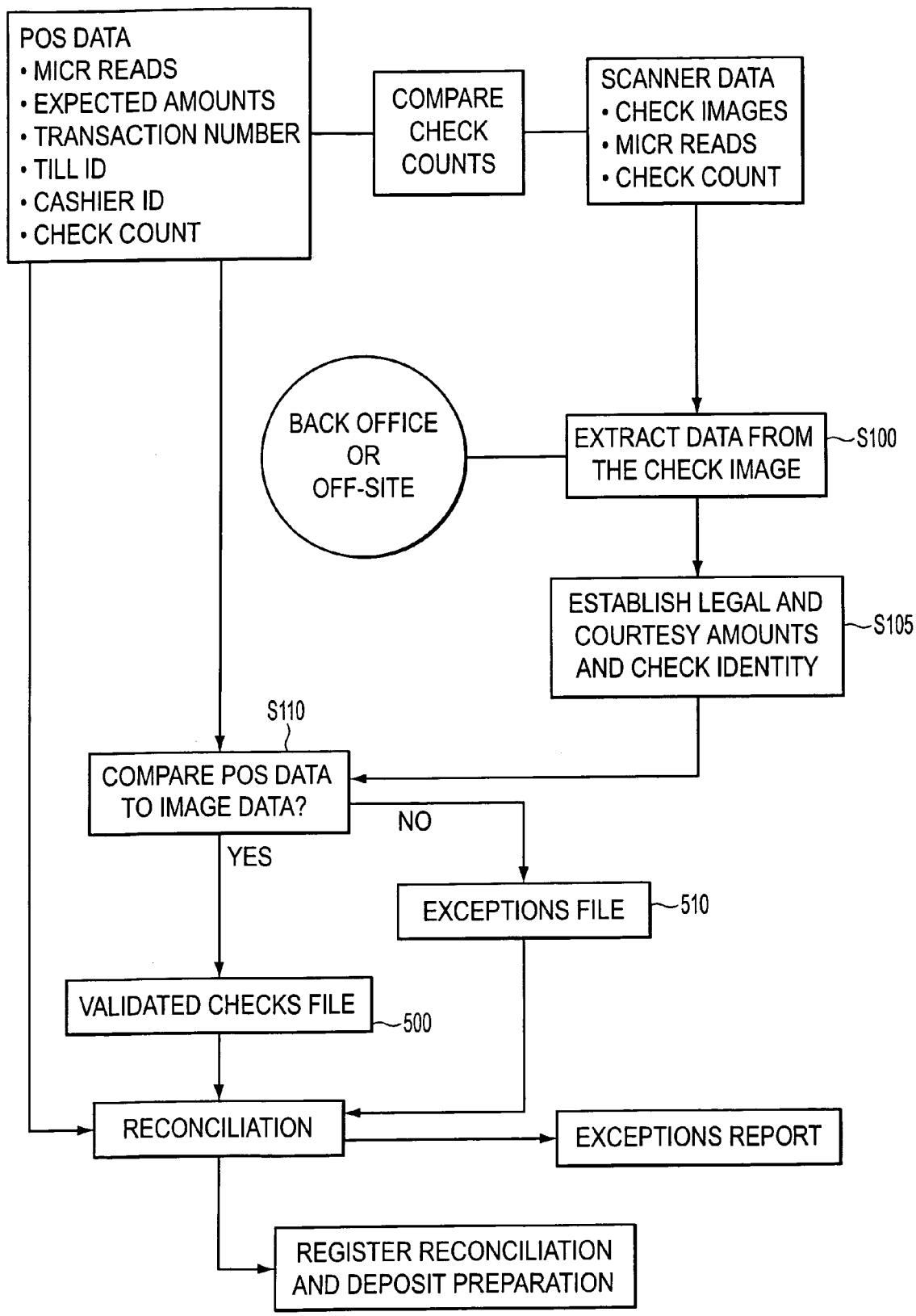
FIG. 3A illustrates a further portion of an exemplary check processing system and method according to an embodiment of the invention
Figure 3B:
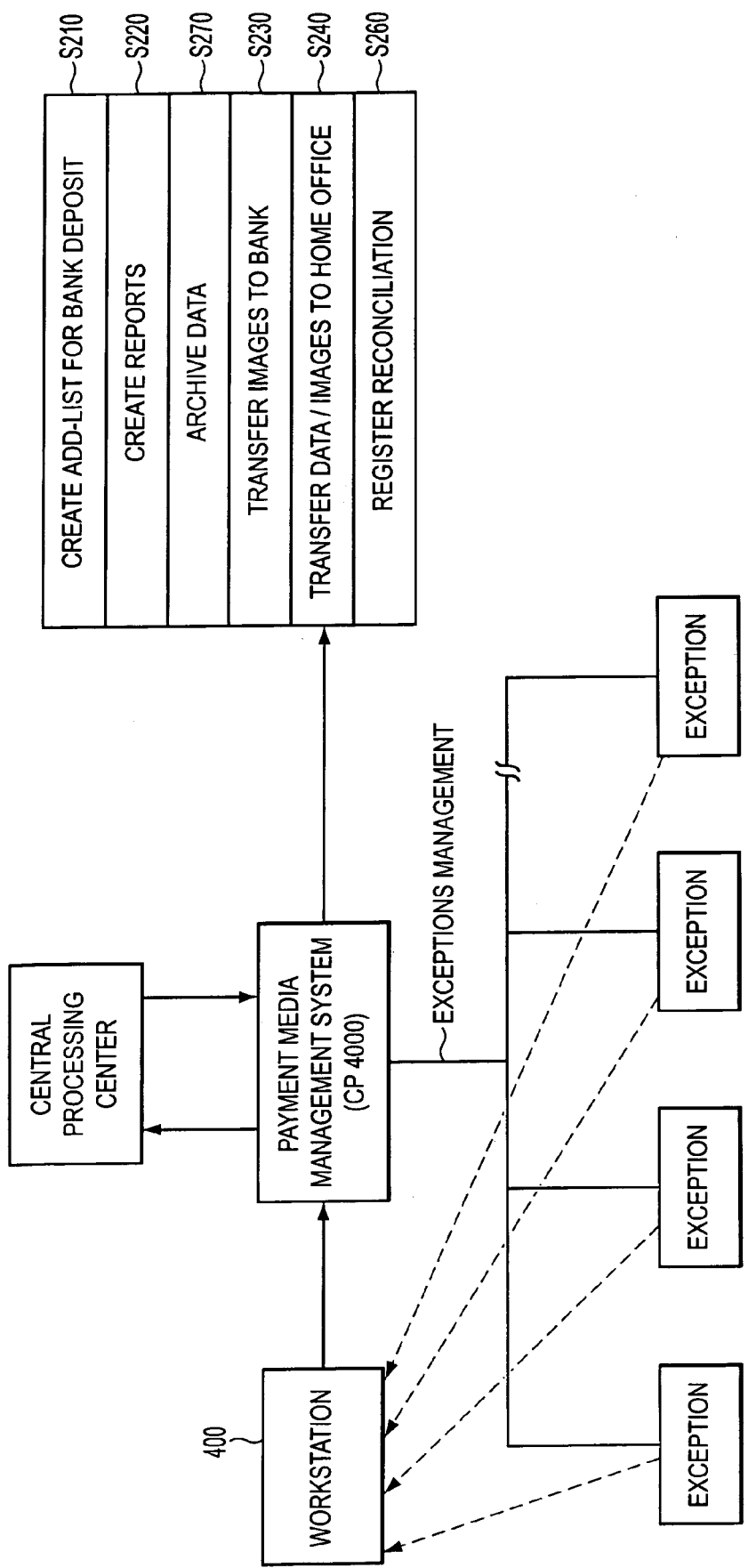
FIG. 3B illustrates yet a further portion of an exemplary check processing system and method according to an embodiment of the invention.
Figure 3C:
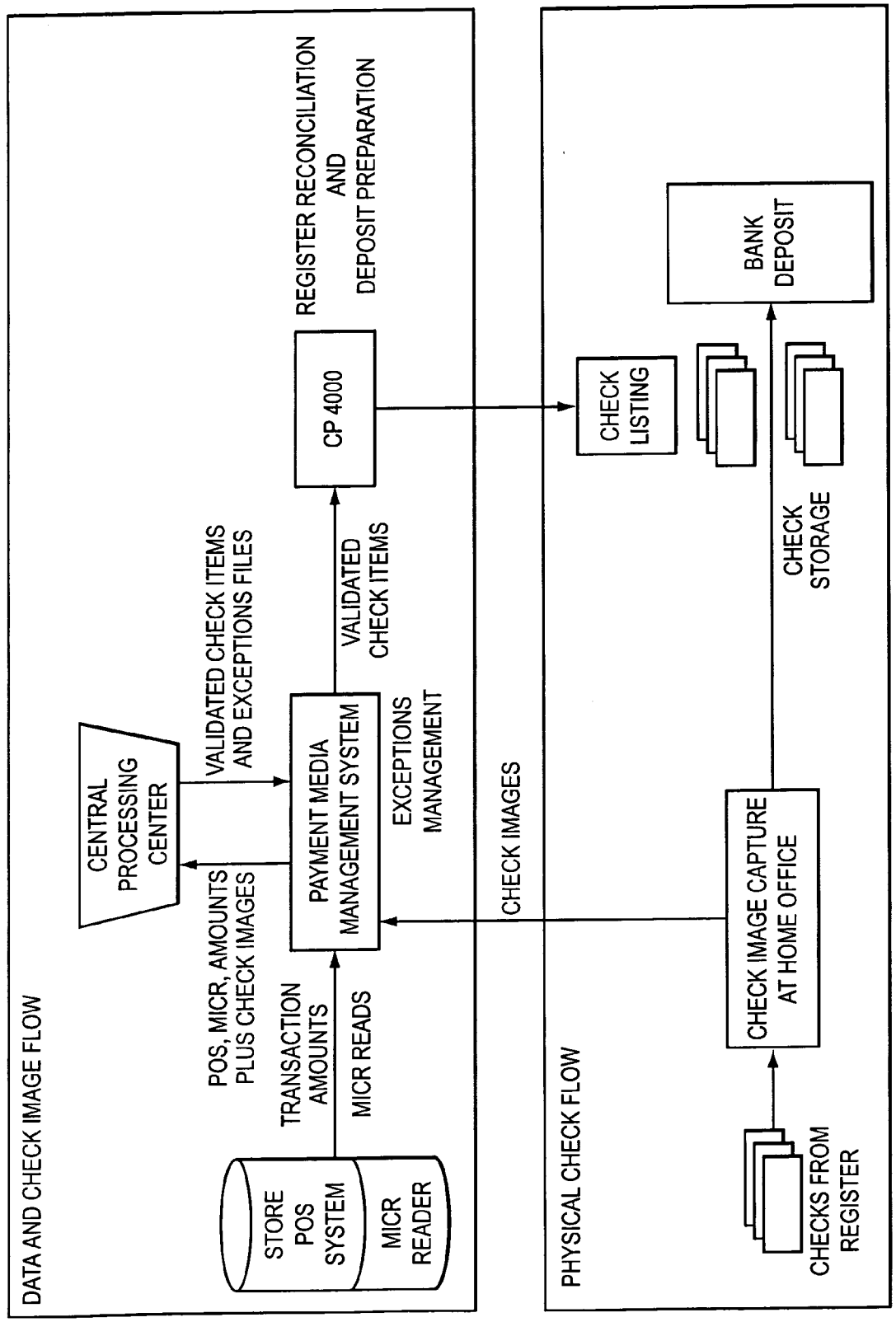
FIG. 3C illustrates in pictorial diagram form an exemplary implementation of the check processing system and method of one embodiment of the invention.

FIGS. 3A and 3B show in flow form various portions of the processing in accordance with aspects of the present invention after the POS data and check image capture steps are performed. After the check count comparison step is accomplished, if performed, and assuming the check count tallied by the scanner is within the acceptable margin of the total number of checks determined from the POS data, both sets of data for complementing intervals are routed to a suitably programmed computer where validation of the check amounts can be automatically accomplished.

This routing of the data sets to the computer can be initiated by an operator through the work station 400, or rather, preferably, triggered by an appropriate parameter through the work flow management function of the controlling software, such as the CP4000™. A parameter that would initiate the routing step could, for example, be the time of day and/or availability of a complete set of check image data from the scanner and the corresponding complementary set of POS data. So, for example, in that circumstance where the data is to be processed by a central processing center, and that central processing center is involved in the validation of the data received from more than one retail outlet, for the same retailer, the data can be triggered by a prearranged time after the closing of the store but before its opening the next day. The data might be processed in the early morning hours and the validated results returned to the retailer before its opening the next day in time for necessary, remaining reconciliations to take place prior to the start of business that following morning.

The first step in the validation process S100 involves the extraction of the necessary data (check amount) from the captured image of the check. To accomplish this, a suitable OCR (Optical Character Recognition) software application is installed on a computer, for example, 250, if the activity occurs on-site. An example of software suitable to perform the OCR function is the SoftCar Plus brand software also available from UNISYS. The OCR data typically would include the check amount, i.e., the courtesy amount 110 and legal amount 120 from the check, each a further indicator of the monetary value of a check, account holder information 130, financial institution information 140 and possibly the signature 160 and date 170 (S105).

Of course, the OCR determinations of the courtesy amount and the legal amount can be deficient for various reasons including the vagaries of human behavior in writing these amounts as well as possible shortcomings attributable to the image itself The validation process continues with appropriate software on the then processing computer necessary to compare, S110, the identity and expected amounts data for the checks as contained in the POS data with the established identity and check value amounts obtained from the interrogation of the check image, S105. The image data again will include the MICR line, courtesy amount and legal amount. Initially the check image MICR line is compared to the MICR line from the POS data file. If the lines are confirmed to be the same, the image can be attributed as a copy of the check received at the point of entry to the system. Then in a subsequent comparison, if the amount in the POS data file equals the courtesy amount of the check image, the check is validated. If the courtesy amount cannot be confirmed as equal to the expected amount in the POS file, but the legal amount can be, at this point the check is validated. This embodiment of the present invention provides for a comparison of the POS expected value to the courtesy value and if not successful, comparison to the legal amount. Without the availability of the POS value to allow for a comparison, the probabilities that the OCR determinations of the values in fact are identical to the actual value of the transaction would be considerably less. The ability to compare as provided for by the present invention significantly enhances the probabilities of automatically validating the checks, thus enhancing the system's ability to automatically reconcile transactions and registers. Validated checks are stored in a validated checks file 500 for eventual return to the retailer for further processing. If neither the courtesy nor legal amount equals the POS file amount, an exception is noted and the item is then available for additional processing directed to assisting in the resolution of its exception status.

Towards this end, the software continues its interrogation of the data by a series of queries leading to possible eventual validation through manual intervention. These queries lead to an exception file 510 containing the various anomalies which is returned with the validated check file 500 to the retailer where the discrepancies hopefully may be resolved. For example, the process step S110 might consider a case where a MICR line from the POS data for a given check could not be matched with a MICR line accompanying the check image data. In this situation, two possibilities may arise which would be treated differently. This scenario assumes that the analyzing software has at least established an amount for the check from the scanned image. The first circumstance would be where the image of the check, typically the back of the check, reveals the supporting till or cashier identification data. Although not mentioned earlier, the Source NDP scanner has the capability of creating images of both the front and back of the check, as do other similar scanners. At the time of the receipt of the check at the point of sale register, where this capability might need to be exploited in the check validation stage, the register would enter the till and/or cashier id number, typically on the back of the check. Assuming, in fact, that this information was available, such that the image would be able to associate the established amount with a supporting till and/or cashier then the data would be stored for subsequent attribution, again through the reconciliation software, i.e., the CP4000™ software package, for example, to an appropriate till or cashier thus enhancing the probabilities of reconciliation when considered together with the available MICR line data. The second circumstance would be where the till and/or cashier id is not anywhere present on the check image. In this situation, an exception would be identified and highlighted in the returned work product of the validation software. Upon receipt back from the validation activity, the reconciliation software, again the CP4000™ package, would prompt an operator at the work station 400 to look at the physical check, perhaps assisted by an image of the check, to see if the check can be associated with a particular till or cashier. If the work station operator is successful, he/she would accordingly attribute the check to the appropriately stored till file accessible through the reconciliation software. If the work station operator can not resolve the issue, he/she enters it into the system through the reconciliation software as an un-reconciled item to be dealt with as the retailer's procedures direct.

A second scenario which the validation software is adapted to resolve involves the circumstance where the MICR line obtained through the check scanning cannot be matched to a POS MICR line, and further, the validation software was unable to establish an amount for the check. Again, an exception report would be issued in this circumstance and made available to the retailer with the return of the validation and exception files, with a prompt to the work station operator to look at the physical check. Again the image could be made available at the work station to facilitate the subsequent investigation. If the amount and till identification can be established, the work station would enter this data and process it through the reconciliation software. If the amount could be established but not the till, then the operator would enter the event as an unreconciled item. If, however, the till could be established but not the amount from the operator's observation of the check, the operator of the work station would access the till data file and enter a note that the check writer be contacted to resolve the discrepancy.

Yet another scenario that might be encountered during the validation process involves the situation where MICR data lines can be matched between the POS data and the scanned data, however, the OCR software was unable to establish an amount from the check image. Again, as an exception, upon review by the work station operator, he/she would be prompted to once again look at the physical check to see if in fact an amount could be established. If so, the operator enters the amount through the interface and the reconciliation software seeks appropriate disposition by comparing the keyed amount to the POS data file for the corresponding MICR line. If in fact, a review of the physical check still leaves the amount in question, once again the operator would prompt the system to contact the check writer to resolve the amount.

And yet another possible exception which might arise would involve the circumstance where the POS MICR data is unmatched with the MICR data from the scanned image. This event would be highlighted for the involved check, once again in the exception report accompanying the returned validation file(s) to be further analyzed in accordance with the reconciliation process inherent in the reconciliation software such as the CP4000™.

As noted, the validated check file 500 and an exception file 510 are prepared and transmitted back to the sending site. Once at the site, the file data is imported into the reconciliation software system such as included in the CP4000™ system. The CP4000™ system extracts the data and places check items in each till record for balancing and prepares the add list through printer 420, for example, to accompany a bank deposit slip. The CP4000™ system can direct the printer to print the add listing, check exception report and other pertinent information extracted from the POS and image scan data bases as required. See FIG. 3B.

Once the check data has been captured and quality assured, it can be further processed to provide added value to the retailer. As noted above, some of the results of the process of the reconcilement of the POS check data and the check image data is the balancing of the till register; the development of an add list to accompany the bank deposit slip and physical bundle of checks S210; and the creation of an exception report S220 which highlights for example the discrepancies between the POS and check image data as relates to missing entries in either data base to facilitate validation and subsequent reconciliation; and image availability for transfer to third parties, S230, S240.

By automatically generating the add list to accompany the deposit slip, rather than having this done manually, a significant time saving can be made. Automatic generation of the add list also limits the possibility of human error. The bank deposit information may be handled in isolation to the banking data for other media (bills, coins, etc.) or in combination with that payment media. The add list would include at least the check amount of each check and the checks would be sequentially listed thereon in the order they appear in the physical stack, which meets the standard bank check deposit requirements.

Obviously the handling of checks according to the processes described herein generates a significant amount of valuable data, all or some of which may be of use to the retailer. It is therefore possible to generate reports (step S220) both automatically and on request. In addition to the exception reports noted above, typically the reports will outline various aspects of check activity such as number of checks passed within a period, value of checks passed, number of mis-tendered checks, number of checks for re-presentment, etc.

In addition to this reporting of check activity it also is possible to use information present on the check for other non-payment related purposes. For example many checks carry a significant amount of data about the payer. For example the payer's name, address, bank details, ZIP or postcode, and in some instances their phone number. Such information can be extracted from the check and then combined with POS data to build up a profile of the customer. For example, POS data not only contains information on the cost of goods but also details of the goods purchased. The invention therefore makes it possible to provide a link between the check payer and their purchases in a similar manner to loyalty card schemes. If the check also carried information such as the customer's home or business address, the retailer can send the customer details of special offers or discount coupons based upon the customer's past purchase history. Similar to the handling of the POS and check image information by the off-site center, the check image and its associated POS data could be transmitted to the retailer's home office (HO) (step S240), which would perform the processing described above. Further, the home office can have ready access to the data on a near real time basis. Together with information involving other forms of payment media, for example notes and coin, corporate decisions can be better made concerning optimizing safe values for individual stores and more broadly so as to enable better investment strategies as to surpluses. Still further, the home office can identify on a relative basis, trouble areas so that losses can be investigated thoroughly and quickly.

Check images can be archived, S270, to support and facilitate check re-presentment and eventually, if necessary, NSF collections. Also the archived checks are available to provide check reconstruction if the physical check is lost or mutilated.

Various alternative embodiments of the elements of the invention or the invention as a whole may be employed without departing from the broad scope of the invention. Additional features may be added again without diminishing the breadth of the invention heretofore described.

While the exemplary embodiment of the invention elaborated on the application of its principles to personal check media, the invention must be seen to have broader application so as to include other forms of payment media within its scope, for example money orders, travelers checks and other media where the transaction amount entered at the POS may differ from the value of the payment media exchanged for the goods or services.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A check processing system comprising:
    an image scanner that produces an electronic image of a check upon scanning of the check; and
    a controller that:
        receives the electronic image of the check from the image scanner,
        receives point-of-sale data generated at a point-of-sale,
        determines a monetary value of the check from the electronic image of the check, and
        reconciles the determined monetary value of the check with the point-of-sale data so that the check is correlated with a transaction that occurred at the point-of-sale.

2. The check processing system of claim 1, wherein the controller determines the monetary value of the check using an optical character recognition process.

3. The check processing system of claim 2, wherein the controller uses the point-of-sale data in conjunction with the optical character recognition process to determine the monetary value of the check.

4. The check processing system of claim 2, wherein the controller determines the monetary value of the check by performing the optical character recognition process on the courtesy amount written on the check.

5. The check processing system of claim 1, wherein the controller: (i) receives electronic images of a plurality of checks from the image scanner, (ii) receives the point-of-sale data relating to a plurality of transactions occurring at the point-of-sale, (iii) determines the monetary value of each of the plurality of checks, and (iv) reconciles the determined monetary value of the plurality of checks with the point-of-sale data so that each of the checks is correlated with a corresponding transaction that occurred at the point-of-sale.

6. The check processing system of claim 1, wherein the image scanner is provided at a location that is remote from the point-of-sale.

7. The check processing system of claim 6, wherein the controller is linked to a terminal at the point-of-sale by a communications network.

8. The check processing system of claim 1, wherein the image scanner is provided at the point-of-sale.

9. The check processing system of claim 1, wherein the point-of-sale data includes: (i) a transaction identifier, (ii) a transaction amount associated with the transaction identifier, and (iii) MICR data associated with the transaction identifier and that was read from a check that was used for a transaction corresponding to the transaction identifier.

10. The check processing system of claim 9, wherein the point-of-sale data includes a transaction identifier, a transaction amount and MICR data for each of a plurality of transactions.

11. The check processing system of claim 10, wherein the controller associates the electronic image of the check with one of the transactions included in the point-of-sale data.

12. The check processing system of claim 1, wherein the controller generates a list of all checks that have been reconciled with the point-of-sale data.

13. The check processing system of claim 12, wherein the list is an add list for accompanying a bank deposit slip.

14. The check processing system of claim 1, further comprising a memory, wherein the controller stores the electronic image of the check in the memory.

15. The check processing system of claim 1, wherein the controller generates a database of customer information based upon data obtained from the electronic image of the check and the point-of-sale data correlated with the check.

16. The check processing system of claim 1, further comprising a terminal that generates the point-of-sale data.

17. The check processing system of claim 16, wherein the terminal is an electronic cash register.

18. The check processing system of claim 17, wherein the electronic cash register includes a magnetic ink reader that reads magnetic ink on the check to generate MICR data that is included in the point-of-sale data.

19. A check processing system comprising:
an image scanner that produces an electronic image of a check upon scanning of the check; and
a controller that;
receives the electronic images of a plurality of checks from the image scanner,
determines a monetary value of the plurality of checks from the electronic images of the checks,
generates a list of all checks for which the monetary value has been determined,
receives point-of-sale data relating to a plurality of transactions occuring at a point-of-sale, and
reconciles the determined monetary value of the plurality of checks with the point-of-sale data so that each of the checks is correlated with a corresponding transaction that occurred at the point-of-sale.

20. The check processing system of claim 19, wherein the list is an add list for accompanying a bank deposit slip.

21. The check processing system of claim 19, wherein the controller determines the monetary value of the checks using an optical character recognition process.

22. The check processing system of claim 21, wherein the controller determines the monetary value of the checks by performing the optical character recognition process on the courtesy amount written on the checks.

23. The check processing system of claim 21, wherein the controller uses the point-of-sale data in conjunction with the optical character recognition process to determine the monetary value of the checks.

24. The check processing system of claim 23, wherein the image scanner is provided at a location that is remote from the point-of-sale.

25. The check processing system of claim 24, wherein the controller is linked to a terminal at the point-of-sale by a communications network.

26. The check processing system of claim 23, wherein the image scanner is provided at the point-of-sale.

27. The check processing system of claim 23, wherein the point-of-sale data includes for each of a plurality of transactions: (i) a transaction identifier, (ii) a transaction amount associated with the transaction identifier, and (iii) MICR data associated with the transaction identifier and that was read from a check that was used for a transaction corresponding to the transaction identifier.

28. The check processing system of claim 23, wherein the controller generates a database of customer information based upon data obtained from the electronic images of the checks and the point-of-sale data correlated with the check.

29. The check processing system of claim 23, further comprising a terminal that generates the point-of-sale data.

30. The check processing system of claim 29, wherein the terminal is an electronic cash register.

31. The check processing system of claim 30, wherein the electronic cash register includes a magnetic ink reader that reads magnetic ink on the check to generate MICR data that is included in the point-of-sale data.

32. The check processing system of claim 19, further comprising a memory, wherein the controller stores the electronic images of the checks in the memory.

33. A method of processing checks comprising the steps of:
obtaining an electronic image of a check;
obtaining point-of-sale data generated at a point-of-sale;
determining a monetary value of the check from the electronic image of the check; and
reconciling the determined monetary value of the check with the point-of-sale data so that the check is correlated with a transaction that occurred at the point-of-sale.

34. The method of claim 33, wherein the step of determining the monetary value of the check uses an optical character recognition process.

35. The method of claim 34, wherein the step of determining the monetary value of the check uses the point-of-sale data in conjunction with the optical character recognition process.

36. The method of claim 35, wherein the optical character recognition process includes the step of determining whether an estimated value of the check, determined from the electronic image of the check, corresponds to a transaction amount included in the point-of-sale data.

37. The method of claim 34, wherein the monetary value of the check is determined by performing the optical character recognition process on the courtesy amount written on the check.

38. The method of claim 33, wherein: (i) electronic images of a plurality of checks are obtained, (ii) the point-of-sale data relates to a plurality of transactions occurring at the point-of-sale, (iii) the monetary value of each of the plurality of checks is determined, and (iv) the determined monetary value of the plurality of checks is reconciled with the point-of-sale data so that each of the checks is correlated with a corresponding transaction that occurred at the point-of-sale.

39. The method of claim 33, wherein the electronic image of the check is generated by an image scanner that is provided at a location that is remote from a location where the point-of-sale data is generated.

40. The method of claim 33, wherein the electronic image of the check is generated by an image scanner that is provided at a location where the point-of-sale data is generated.

41. The method of claim 33, wherein the point-of-sale data includes: (i) a transaction identifier, (ii) a transaction amount associated with the transaction identifier, and (iii) MICR data associated with the transaction identifier and that was read from a check that was used for a transaction corresponding to the transaction identifier.

42. The method of claim 41, wherein the point-of-sale data includes a transaction identifier, a transaction amount and MICR data for each of a plurality of transactions.

43. The method of claim 42, wherein the electronic image of the check is associated with one of the plurality of transactions included in the point-of-sale data.

44. The method of claim 33, further comprising generating a list of all checks that have been reconciled with the point-of-sale data.

45. The method of claim 44, wherein the list is an add list for accompanying a bank deposit slip.

46. The method of claim 33, further comprising storing the electronic image of the check in a memory.

47. The method of claim 33, further comprising generating a database of customer information based upon data obtained from the electronic image of the check and the point-of-sale data correlated with the check.

48. The method of claim 46, further comprising transmitting the electronic images of a plurality of checks from a retailer associated with the point-of-sale to a financial institution.

49. The method of claim 46, further comprising transmitting the electronic images of a plurality of checks from a retailer associated with the point-of-sale to a central check clearing house.

50. The method of claim 46, further comprising using the stored electronic image of a check to reconstruct a check that has been lost.

51. The method of claim 46, further comprising submitting the electronic image of a check, which did not clear a financial institution on a first clearance attempt due to not-sufficient-funds, to the financial institution for a subsequent clearance attempt, instead of resubmitting the physical check to the financial institution.

52. A method of processing checks comprising:

obtaining electronic images of a plurality of checks;

determining a monetary value of the plurality of checks from the electronic images of the checks;

generating a list of all checks for which the monetary value has been determined, receiving point-of-sale data generated at a point-of-sale relating to a plurality of transactions occurring at the point-of-sale, and reconciling the determined monetary value of the plurality of checks with the point-of-sale data so that each of the checks is correlated with a corresponding transaction that occurred at the point-of-sale.

53. The method of claim 52, wherein the list is an add list for accompanying a bank deposit slip.

54. The method of claim 52, wherein the monetary value of the checks is determined using an optical character recognition process.

55. The method of claim 54, wherein the monetary value of the checks is determined by performing the optical character recognition process on the courtesy amount written on the checks.

56. The method of claim 54, further comprising:

using the point-of-sale data in conjunction with the optical character recognition process to determine the monetary value of the checks.

57. The method of claim 56, wherein the electronic images of the checks are generated by an image scanner that is provided at a location that is remote from the point-of-sale.

58. The method of claim 56, wherein the electronic images of the checks are generated by an image scanner that is provided at the point-of-sale.

59. The method of claim 56, wherein the point-of-sale data includes for each of a plurality of transactions: (i) a transaction identifier, (ii) a transaction amount associated with the transaction identifier, and (iii) MICR data associated with the transaction identifier and that was read from a check that was used for a transaction corresponding to the transaction identifier.

60. The method of claim 56, further comprising generating a database of customer information based upon data obtained from the electronic image of the checks and the point-of-sale data correlated with the checks.

61. The method of claim 52, further comprising storing the electronic images of the checks in a memory.

62. The method of claim 61, further comprising using the stored electronic image of a check to reconstruct a check that has been lost.

63. The method of claim 61, further comprising submitting the electronic image of a check, which did not clear a financial institution on a first clearance attempt due to not-sufficient-funds, to the financial institution for a subsequent clearance attempt, instead of resubmitting the physical check to the financial institution.

64. The method of claim 52, further comprising transmitting the electronic images of the plurality of checks from a retailer to a financial institution.

65. The method of claim 52, further comprising transmitting the electronic images of the plurality of checks from a retailer to a central check clearing house.

* * * * *